(12) United States Patent
Tanaka et al.

(10) Patent No.: US 10,434,663 B2
(45) Date of Patent: Oct. 8, 2019

(54) VACUUM DEVICE AND ARTICLE HOLDING DEVICE

(71) Applicant: Kabushiki Kaisha Toshiba, Minato-ku (JP)

(72) Inventors: Junya Tanaka, Tokyo (JP); Akihito Ogawa, Fujisawa (JP); Atsushi Sugahara, Kawasaki (JP); Hideichi Nakamoto, Tokyo (JP); Takafumi Sonoura, Yokohama (JP); Haruna Eto, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 1 day.

(21) Appl. No.: 15/262,289

(22) Filed: Sep. 12, 2016

(65) Prior Publication Data

US 2017/0073174 A1    Mar. 16, 2017

(30) Foreign Application Priority Data

Sep. 15, 2015    (JP) .................................. 2015-182101

(51) Int. Cl.
*B25J 15/06*    (2006.01)
*B65G 47/91*    (2006.01)

(52) U.S. Cl.
CPC ....... *B25J 15/0625* (2013.01); *B25J 15/0633* (2013.01); *B65G 47/91* (2013.01)

(58) Field of Classification Search
CPC ................ B25J 15/0616; B25J 15/0625; B25J 15/0683; B25J 15/0633
See application file for complete search history.

(56) References Cited

U.S. PATENT DOCUMENTS

| | | | | | |
|---|---|---|---|---|---|
| 4,736,938 A | * | 4/1988 | Jiruse | .................. | B65H 3/0883 271/90 |
| 5,755,550 A | * | 5/1998 | Brandt | .................. | B65G 47/91 294/188 |
| 6,457,693 B1 | * | 10/2002 | Nagai | .................. | B25J 15/0616 248/205.5 |
| 6,612,633 B1 | * | 9/2003 | Tell | ........................ | B65G 47/91 294/186 |
| 10,118,300 B2 | * | 11/2018 | Wagner | ................ | B25J 15/0683 |
| 10,150,219 B2 | * | 12/2018 | Ridel | .................... | B25J 11/0045 |
| 2005/0275367 A1 | * | 12/2005 | Buehler | .................. | B25J 9/102 318/568.12 |
| 2010/0080680 A1 | * | 4/2010 | Okamoto | ............. | B25J 15/0616 414/737 |
| 2015/0108779 A1 | | 4/2015 | Heitplatz et al. | | |

(Continued)

FOREIGN PATENT DOCUMENTS

| | | |
|---|---|---|
| JP | 62-63083 | 3/1987 |
| JP | 1-246899 A | 10/1989 |

(Continued)

*Primary Examiner* — Gerald McClain
(74) *Attorney, Agent, or Firm* — Oblon, McClelland, Maier & Neustadt, L.L.P.

(57) ABSTRACT

An vacuum device includes a suction pad vacuumed on a to-be-vacuumed surface of a vacuum target, and a bellows tube having the suction pad at one end in a telescopic direction and having an internal space that is expanded and contracted by pressure of air, the telescopic member being elongated and contracted by expansion and contraction of the internal space.

7 Claims, 8 Drawing Sheets

(56) References Cited

U.S. PATENT DOCUMENTS

| | | |
|---|---|---|
| 2015/0344225 A1 | 12/2015 | Nakamura et al. |
| 2018/0207808 A1* | 7/2018 | Tanaka ................. B25J 15/0616 |
| 2018/0333866 A1* | 11/2018 | Wagner ................ B25J 15/0683 |

FOREIGN PATENT DOCUMENTS

| | | | |
|---|---|---|---|
| JP | 6-86342 U | | 12/1994 |
| JP | 8-264995 A | | 10/1996 |
| JP | 2000071183 A | * | 3/2000 |
| JP | 2002-18769 A | | 1/2002 |
| JP | 2002018769 A | * | 1/2002 |
| JP | 2002-137184 A | | 5/2002 |
| JP | 2012-86950 | | 5/2012 |
| JP | 2015-49440 A | | 3/2015 |
| JP | 2015-224125 A | | 12/2015 |
| WO | WO 88/03462 | | 5/1988 |
| WO | WO 2014/189435 A1 | | 11/2014 |

* cited by examiner

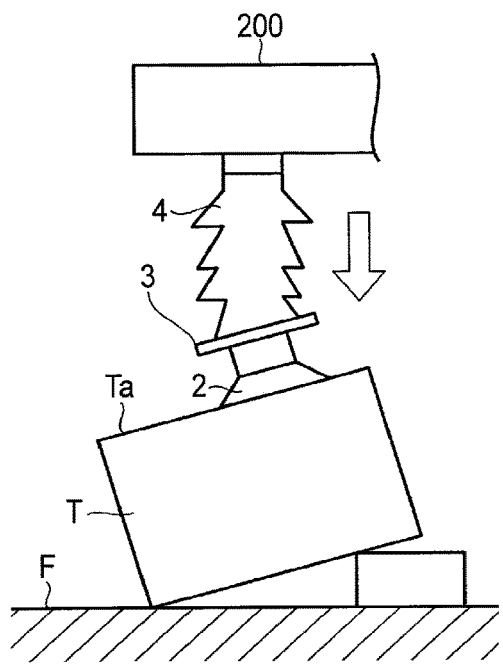
F I G. 3
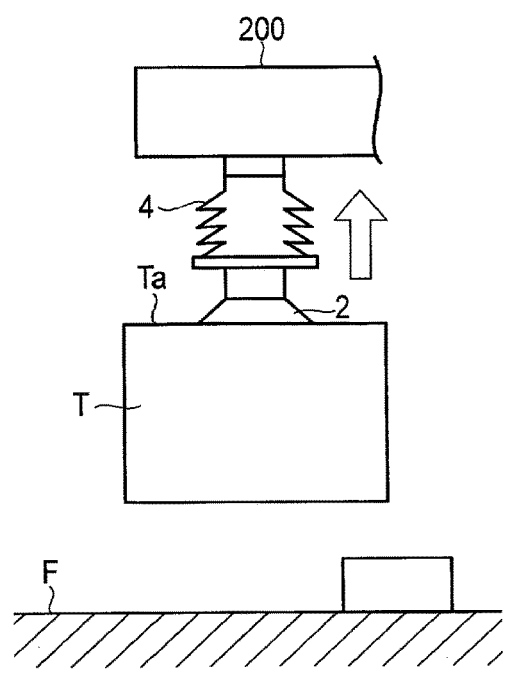
F I G. 4

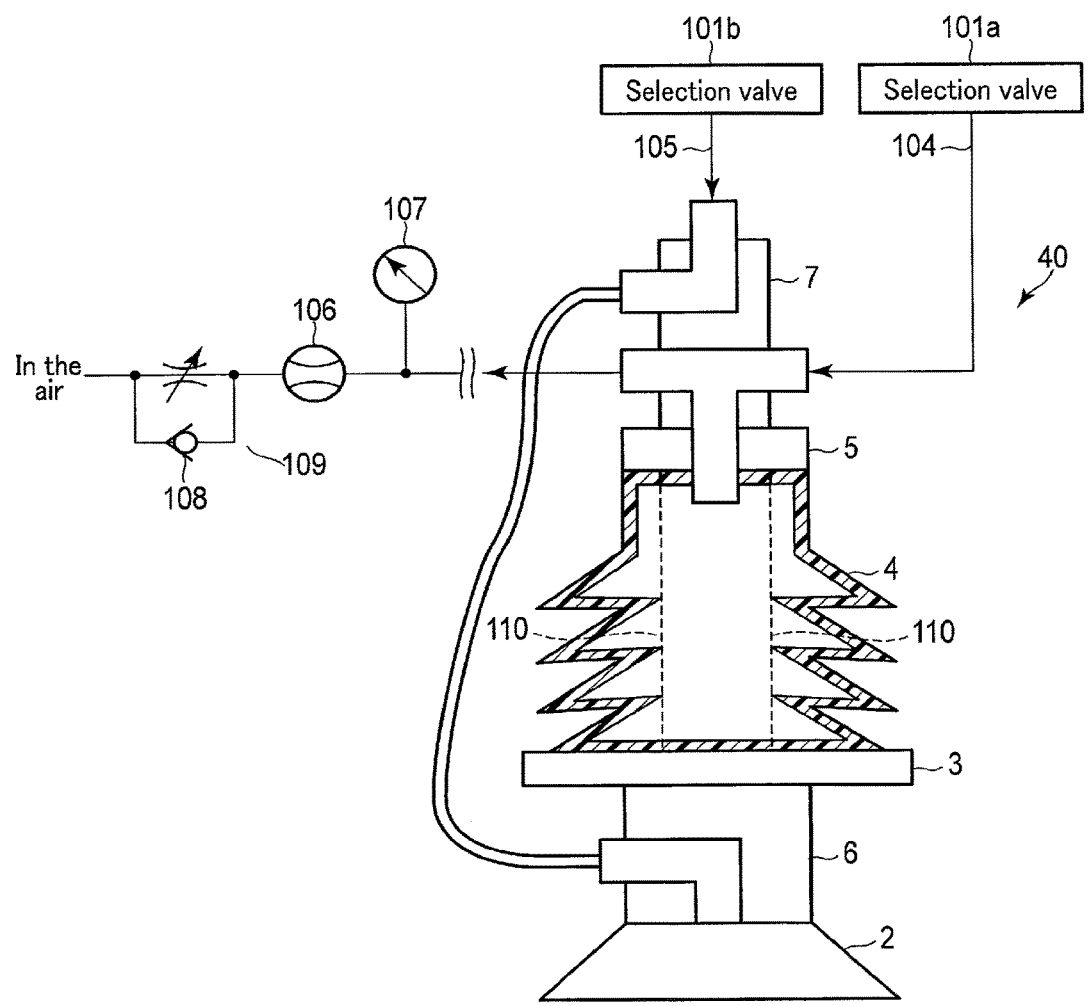
F I G. 7

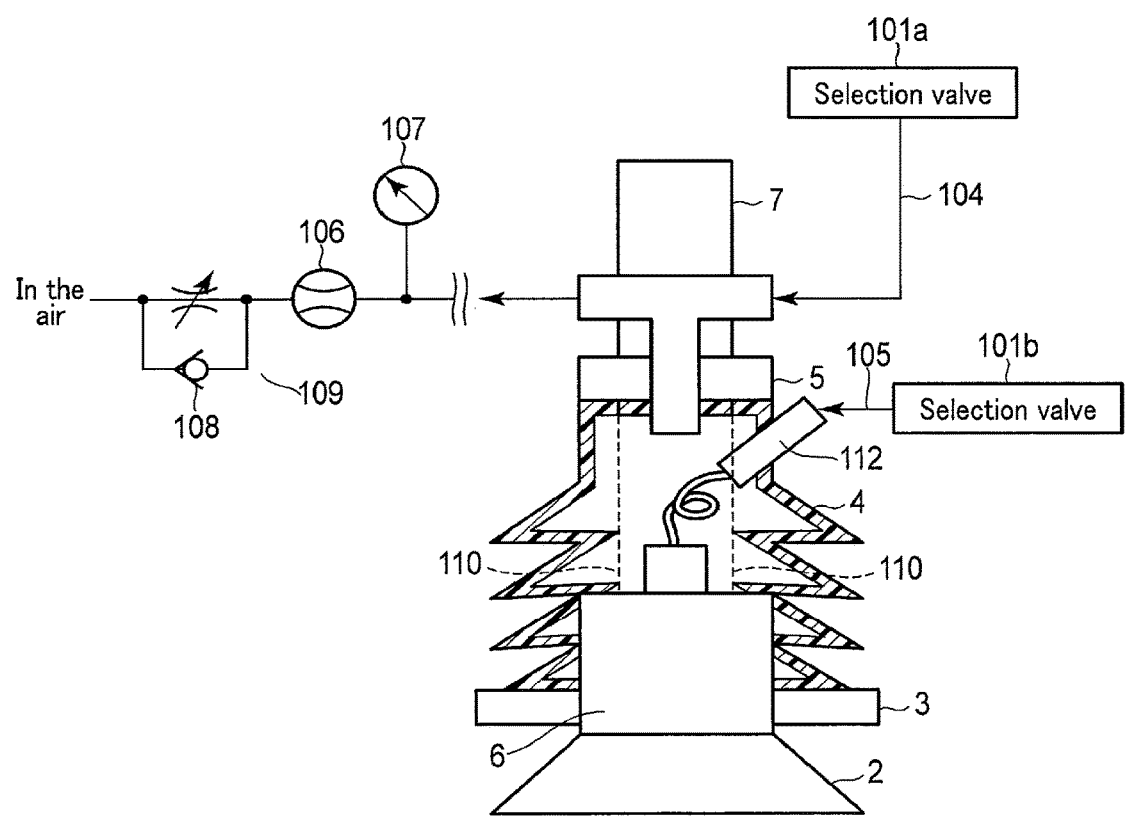
F I G. 8

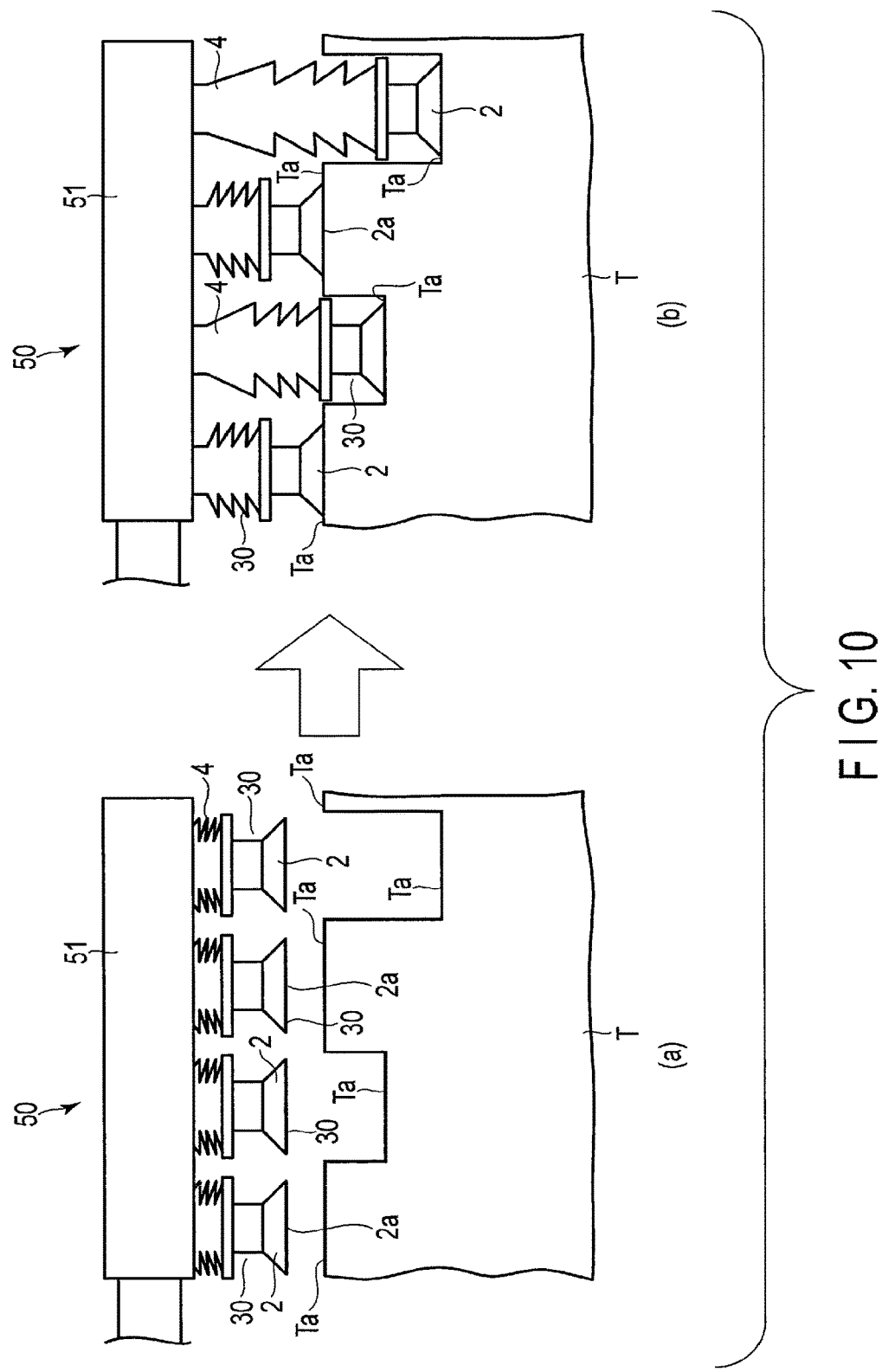
F I G. 10

VACUUM DEVICE AND ARTICLE HOLDING DEVICE

CROSS-REFERENCE TO RELATED APPLICATIONS

This application is based upon and claims the benefit of priority from prior Japanese Patent Application No. 2015-182101, filed Sep. 15, 2015, the entire contents of which are incorporated herein by reference.

FIELD

Embodiments described herein relate generally to a vacuum device for vacuuming a suction pad to a vacuum target, and an article holding device including the vacuum device.

BACKGROUND

Currently, in the distribution and logistics industry, the number of packages to be handled tends to increase. In recent years, however, there has been a concern that the declining birthrate and aging population invites a labor shortage. Logistic companies are therefore dealing with automation of a logistic system.

The conveyance and storage of packages in warehouses become increasingly automated using conveyor belts. On the other hand, the transfer operation of transferring packages to another place, such as unloading and picking, is difficult to automate and needs some contrivance.

As a device that automates the above transfer operation, a vacuum device is known in which a suction pad is brought into contact with the top of a package to vacuum the package, and raise and move it to a desired place.

However, when the top of a package is inclined with respect to the horizontal plane due to a load shift or when the top of a package itself is bent, it is difficult to vacuum a suction pad onto the top of the package.

Furthermore, for example, when it is considered that a plurality of vacuum devices are arranged in parallel with a hand to vacuum and support a plurality of packages at once, if the packages are different in size, their tops are also different in height, thus making it difficult to vacuum all of the packages at once.

It is therefore desired to develop a vacuum device capable of vacuuming a suction pad onto a to-be-vacuumed surface of a vacuum target with reliability and an article holding device capable of vacuuming a plurality of vacuum target of different sizes at the same time.

BRIEF DESCRIPTION OF THE DRAWING

FIG. 3 is an explanatory diagram illustrating an example of an operation performed by the vacuum device shown in FIG. 1.

FIG. 4 is an explanatory diagram illustrating an example of an operation performed by the vacuum device shown in FIG. 1.

FIG. 7 is a schematic diagram showing a vacuum device according to a fourth embodiment.

FIG. 8 is a schematic diagram showing a modification to the vacuum device shown in FIG. 7.

FIG. 10 is an illustration of an example of an operation performed by the article holding device shown in FIG. 9.

DETAILED DESCRIPTION

According to one embodiment, a vacuum device includes a suction pad vacuumed on a to-be-vacuumed surface of a vacuum target, and a telescopic member having the suction pad at one end in a telescopic direction and having an internal space that expands and contracts, the telescopic member being elongated and contracted by expansion and contraction of the internal space.

Various embodiments will be described hereinafter with reference to the accompanying drawings.

(First Embodiment)

Figure 1:
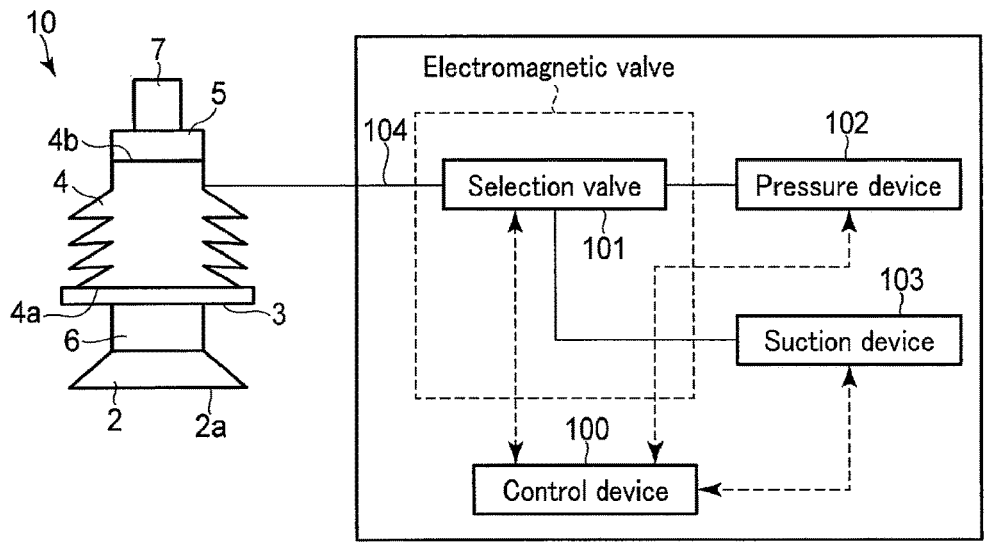
FIG. 1 is a block diagram showing a vacuum device and its control system according to a first embodiment.

FIG. 1 is a block diagram showing a vacuum device 10 and its control system according to a first embodiment. The vacuum device 10 includes a suction pad 2 and a bellows tube (telescopic member) 4.

Figure 2:
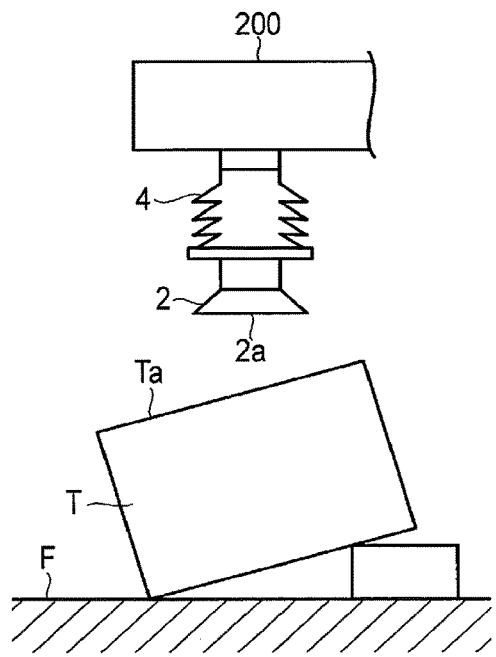
FIG. 2 is an explanatory diagram illustrating an example of an operation performed by the vacuum device shown in FIG. 1.

The suction pad 2 is vacuumed onto a to-be-vacuumed surface Ta of a vacuum target T shown in FIG. 2. In the first embodiment, the suction pad 2 is what is called a suction cap made of, e.g. resin, which is elastically deformed by pressing a vacuum surface 2a of the suction pad 2 onto the to-be-vacuumed surface Ta, thereby to crush an internal space between the vacuum surface 2a and the to-be-vacuumed surface Ta. However, the suction pad 2 may be a type that vacuums the internal space positively by a vacuum pump not shown here, or the suction pad 2 can be replaced with an adhesive that can be adhered to the to-be-vacuumed surface Ta.

The bellows tube 4 is a resin-made tubular member both ends of which are opened in the telescopic direction thereof. The bellows tube 4 is attached in a direction along the central axis thereof, or it is done in such a manner that the telescopic direction is parallel to the vertical direction. A plate-like lower closing member 3 is attached to an opening 4a at the lower end (one end) of the bellows tube 4 to close the opening 4a in an airtight manner. A plate-like upper closing member 5 is attached to an opening 4b at the upper end (the other end) of the bellows tube 4 to close the opening 4b in an airtight manner. In other words, these closing members 3 and 5 make a sealed internal space in the bellows tube 4.

The suction pad 2 is attached to the lower surface of the lower closing member 3 with a lower connection member 6 therebetween. The suction pad 2 is straightly attached to the lower end of the bellows tube 4 in such a manner that the vacuum surface 2a becomes parallel to the surface of the opening 4a of the bellows tube 4. On the other hand, the upper closing member 5 attached to the other end of the bellows tube 4 is connected to a manipulator, not shown, through an upper connection tube 7. In other words, the vacuum device 10 of the first embodiment can be moved to a desired position by the operation of the manipulator.

The control system of the vacuum device 10 includes a control device 100. A selection valve 101 such as an electromagnetic valve is connected to the control device 100. A pressure device 102 such as a compressor and a suction device 103 (a negative pressure device) such as a vacuum pump are selectably connected to one end of the selection valve 101. The other end of the selection valve 101 communicates with the internal space of the bellows tube 4 of the vacuum device 10 through a tube 104.

The pressure device 102 can be built out of an air pipe in a factory as well as a compressor. The suction device 103 can be built not only by a vacuum pump but also by combining a pressure device and a vacuum generator to generate a negative pressure. It is desirable that the tube 104 be a flexible tube and have stiffness such that it is not crushed by vacuuming. As the selection valve 101, a valve that is operated by air pressure can be used.

When the bellows tube 4 of the vacuum device 10 is elongated, the control device 100 connects the selection valve 101 to the pressure device 102 to activate the pressure device 102 and supply air (fluid) into the internal space of the bellows tube 4 of the vacuum device 10. Accordingly, the pressure of the internal space is increased and the bellows tube 4 is elongated, with the result that the vacuum surface 2a of the suction pad 2 is pressed and vacuumed onto the to-be-vacuumed surface of a vacuum target not shown.

On the other hand, when the bellows tube 4 of the vacuum device 10 is contracted, the control device 100 connects the selection valve 101 to the suction device 103 to activate the suction device 103 and vacuum the internal space of the bellows tube 4 of the vacuum device 10. Accordingly, the pressure of the internal space is lowered and the bellows tube 4 is contracted.

In the first embodiment, the bellows tube 4 is elongated and contracted by supplying air into the internal space of the bellows tube 4 and vacuuming the internal space thereof. However, the fluid supplied into the internal space is not limited to air, but for example, gas such as inert gas or liquid such as water and oil can be used.

An example of an operation to be performed by the foregoing vacuum device 10 will be described below with reference to FIGS. 2-4. Assume here that the to-be-vacuumed surface Ta of the vacuum target T is inclined with respect to the floor surface F as shown in FIG. 2. Also, assume that the vacuum target T is a corrugated cardboard box. Furthermore, FIGS. 2-4 each illustrate part of the arm 200 of a manipulator.

First, the manipulator is operated to dispose the vacuum device 10 immediately above the vacuum target T, as shown in FIG. 2. As an initial state, the bellows tube 4 of the vacuum device 10 is contracted to its shortest state, as shown in FIG. 2. When the bellows tube 4 is elongated to its longest state, the vacuum device 10 is disposed at such a height that the vacuum surface 2a of the suction pad 2 can be pressed on the to-be-vacuumed surface Ta with sufficient pressing force.

As shown in FIG. 3, the bellows tube 4 is elongated to press the vacuum surface 2a of the suction pad 2 on the to-be-vacuumed surface Ta of the vacuum target T. At this time, the pressing force of the suction pad 2 can be adjusted to an arbitrary value by controlling the pressure device 102. When the vacuum surface 2a is pressed on the to-be-vacuumed surface Ta, the suction pad 2 is vacuumed onto the to-be-vacuumed surface Ta. Since the to-be-vacuumed surface Ta is inclined with respect to the floor surface F, the vacuum surface 2a of the suction pad 2 is also inclined with respect to the floor surface F. The inclination of the suction pad 2 is generated by elastic deformation of the bellows tube 4.

More specifically, when the bellows tube 4 is elongated, the vacuum surface 2a of the suction pad 2 partly contacts the to-be-vacuumed surface Ta of the target T, the vacuum surface 2a gradually inclines along the inclination of the to-be-vacuumed surface Ta, and the suction pad 2 also inclines. This state is shown in FIG. 3. In this state, the vacuum surface 2a of the suction pad 2 contacts all over the to-be-vacuumed surface Ta of the target T. When the suction pad 2 inclines, the lower closing member 3 to which the suction pad 2 is connected also inclines as shown in FIG. 3, and a portion of the bellows tube 4 near the lower end thereof is elastically changed its shape and bent, as shown in FIG. 3, as the lower closing member 3 inclines.

When the bellows tube 4 is contracted from the above state as shown in FIG. 4, the vacuum target T vacuumed by the suction pad 2 is lifted above from the floor surface F. At this time, the lifting force exerted on the vacuum device 10 can be adjusted to an arbitrary value by controlling the suction device 103. Here, the suction device 103 is so controlled that the lifting force becomes slightly greater than the maximum weight of the target T.

As described above, according to the first embodiment, a simple structure in which the bellows tube 4 is simply elongated, allows the suction pad 2 to be reliably vacuumed onto the inclined to-be-vacuumed surface Ta, thus improving the device itself in reliability. According to the first embodiment, particularly, the suction pad 2 is automatically inclined in an appropriate direction without taking into consideration the inclination direction of the to-be-vacuumed surface Ta of the vacuum target T. Therefore, the device can easily be controlled without needing to control the inclination direction.

Furthermore, according to the first embodiment, since the bellows tube 4 is contracted to its shortest state, the vacuum device 10 can be compacted and inserted into a relatively narrow opening, and its usable range can be expanded. When the bellows tube 4 is contracted to its shortest state, it exhibits a characteristic like that of a thick-walled tube, in which the outer surfaces of adjacent mount-shaped portions of the bellows contact each other. In this state, therefore, the bellows tube 4 can be made difficult to change its shape elastically and, for example, the suction pad 2 can be pressed on the to-be-vacuumed surface Ta with great force.

Furthermore, according to the first embodiment, the bellows tube 4 has high linearity when it is elongated and is used as a telescopic member. Thus, the suction pad 2 can be pressed straightly to a target position of the to-be-vacuumed surface Ta of the vacuum target T, thereby preventing a drawback that the suction pad 2 is vacuumed on an unexpected, undesired position. Therefore, even though the bellows tube 4 is elongated to the longest length, the vacuum position can be set at a target one and the device can be improved in its convenience.

Moreover, according to the first embodiment, since a simple structure of simply elongating and contracting the bellows tube 4 is employed as a driving mechanism to drive the suction pad 2, the structure of the device can be achieved inexpensively and the weight thereof can be lessened. Accordingly, the vacuum device 10 can be moved by the manipulator at high speed and its power consumption can be decreased.

(Second Embodiment)

Figure 5:
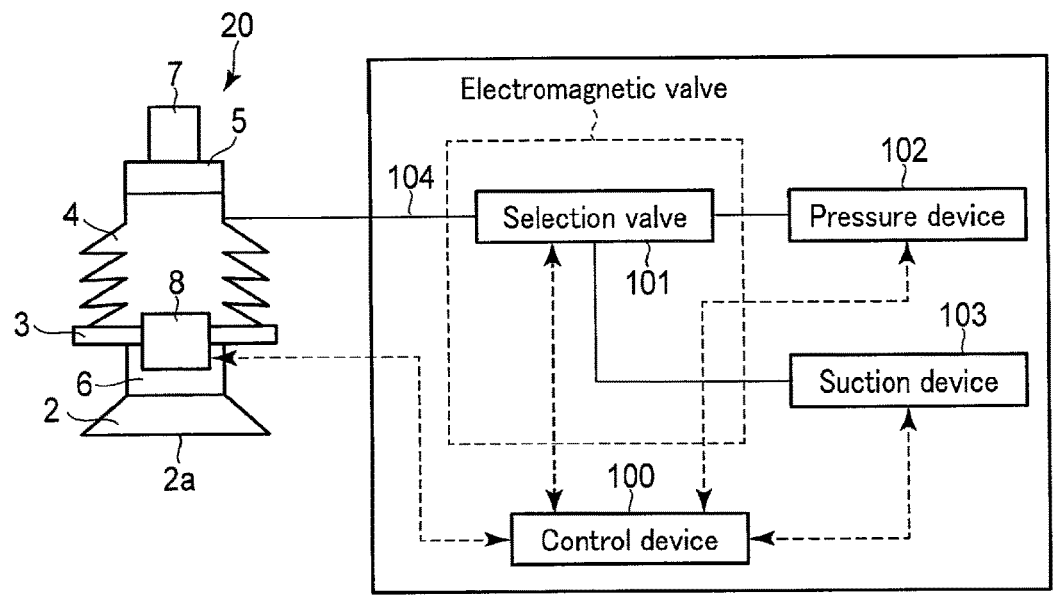
FIG. 5 is a block diagram showing a vacuum device and its control system according to a second embodiment.

FIG. 5 is a block diagram showing a vacuum device 20 and its control system according to a second embodiment.

The vacuum device 20 includes a vacuum generator 8 (negative pressure generator) connected to the bellows tube 4 to allow air to circulate between the vacuum generator 8 and the bellows tube 4. The other structures are the same as those of the vacuum device 10 of the foregoing first embodiment. In the second embodiment, therefore, the structural elements that perform the same function as those of the first embodiment are denoted by the same reference sign and their detailed descriptions will be omitted.

The vacuum generator 8 is a device that generates a vacuum using pressurized air to be supplied into the internal space of the bellows tube 4. As the vacuum generator 8, there are a vacuum ejector, a vacuum pump, a vacuum blower and the like. In the second embodiment, a vacuum ejector is used as the vacuum generator 8. The vacuum generator 8 is connected to the suction pad 2 to vacuum the internal space of the suction pad 2.

To vacuum a vacuum target T using the vacuum device 20, as in the first embodiment, the control device 100 first elongates the bellows tube 4 to bring the suction pad 2 into contact with a to-be-vacuumed surface Ta of the vacuum target T and then activates the vacuum generator 8 to vacuum the suction pad 2. The timing with which the suction pad 2 is brought into contact with the vacuum target T and the timing with which the vacuuming is started can be replaced with each other. In either case, according to the second embodiment, the vacuum target T can reliably be vacuumed on the suction pad 2 without pressing the vacuum surface 2a of the suction pad 2 on the to-be-vacuumed surface Ta of the vacuum target T.

After that, the control device 100 activates the suction device 103 to contract the bellows tube 4 and lift the vacuum target T. At this time, the control device 100 first stops the vacuum generator 8 to close a flow path between the vacuum generator 8 and the bellows tube 4 and seal the internal space of the bellows tube 4, and activates the suction device 103 to vacuum the internal space of the bellows tube 4. When the flow path between the vacuum generator 8 and the bellows tube 4 is closed, a negative pressure applied between the vacuum surface 2a of the suction pad 2 and the to-be-vacuumed surface Ta of the vacuum target T is maintained.

When the manipulator moves the vacuum target T to a desired place, the control device 100 elongates the bellows tube 4 and puts the vacuum target T on a floor, thereby eliminating the negative pressure of the suction pad 2. At this time, the control device 100 supplies pressurized air from the bellows tube 4 to the suction pad 2 through the vacuum generator 8 to eliminate the negative pressure.

As described above, the second embodiment brings about the same advantages as those of the foregoing first embodiment. Furthermore, according to the second embodiment, a negative pressure is positively applied to the suction pad 2. Therefore, even though the to-be-vacuumed surface Ta is inclined, the vacuum target T can reliably be vacuumed, and the possibility that the target object T will drop during its movement can almost be eliminated. In the second embodiment, furthermore, when the suction pad 2 and the vacuum target T are separated from each other, pressurized air is supplied to the suction pad 2. Therefore, the vacuum target T can reliably be separated from the suction pad 2 with desired timing, and the reliability of the process can be enhanced.

(Third Embodiment)

Figure 6:
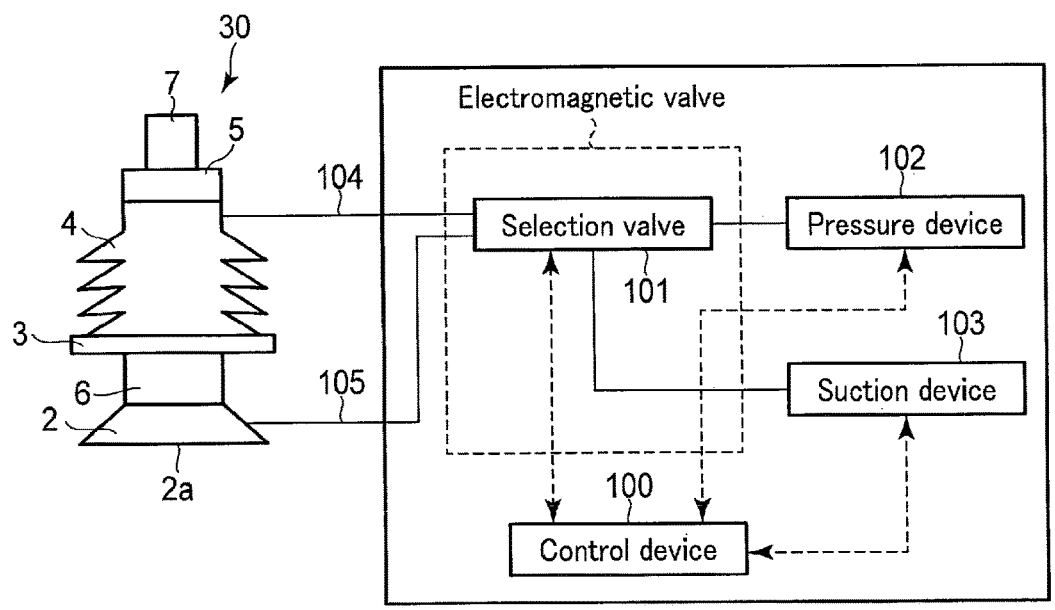
FIG. 6 is a block diagram showing a vacuum device and its control system according to a third embodiment.

FIG. 6 is a block diagram showing a vacuum device 30 and its control system according to a third embodiment. The vacuum device 30 includes a tube 105 to which the selection valve 101 and the suction pad 2 are connected, instead of including the vacuum generator 8. The other structures are the same as those of the vacuum device 20 of the foregoing second embodiment. Thus, the Structural elements that perform the same function as those of the second embodiment are denoted by the same reference sign and their detailed descriptions will be omitted.

To vacuum a vacuum target T using the vacuum device 30, as in the first embodiment, the control device 100 first elongates the bellows tube 4 to bring the suction pad 2 into contact with a to-be-vacuumed surface Ta of the vacuum target T. Then, the control device 100 switches the selection valve 101 to connect the suction device 103 to the suction pad 2, and vacuums the suction pad 2. In other words, the suction device 103 serves as a negative-pressure generator in the third embodiment. The timing with which the suction pad 2 is brought into contact with the vacuum target T and the timing with which the vacuuming is started can be replaced with each other. In either case, according to the third embodiment, the vacuum target T can reliably be vacuumed on the suction pad 2 without pressing the vacuum surface 2a of the suction pad 2 on the to-be-vacuumed surface Ta of the vacuum target T.

After that, the control device 100 switches the selectin valve 101 to cause the suction device 103 to communicate with the internal space of the bellows tube 4, contracts the bellows tube 4 and lifts the vacuum target T. At this time, a negative pressure applied between the vacuum surface 2a of the suction pad 2 and the to-be-vacuumed surface Ta of the vacuum target T is maintained.

When the manipulator moves the vacuum target T to a desired place, the control device 100 elongates the bellows tube 4 and puts the vacuum target T on a floor, thereby eliminating the negative pressure of the suction pad 2. At this time, the control device 100 switches the selection valve 101 to connect the pressure device 102 to the suction pad 2 and supplies pressurized air to the suction pad 2 to eliminate the negative pressure.

As described above, the third embodiment brings about the same advantages as those of the foregoing second embodiment. Furthermore, according to the third embodiment, the selection valve 101 is connected to the suction pad 2 through the tube 105. Therefore, the vacuum generator 8 need not be provided, thereby simplifying the device structure further.

(Fourth Embodiment)

FIG. 7 is a schematic diagram showing a vacuum device 40 according to a fourth embodiment. The vacuum device 40 includes a selection valve 101a connected to the tube 104 communicating with the bellows tube 4 and a selection valve 101b connected to the tube 105 communicating with the suction pad 2. The vacuum device 40 also includes a flowmeter 106 and a pressure gauge 107, which are provided halfway through the tube 104. The vacuum device 40 also includes a flow control device 109 including a safety valve 108. Furthermore, the vacuum device 40 includes a plurality of extension regulating wire 110 in the internal space of the bellows tube 4. The other structures are the same as those of the vacuum device 30 of the foregoing third embodiment. In the fourth embodiment, therefore, the structural elements that perform the same function as those of the third embodiment are denoted by the same reference sign and their detailed descriptions will be omitted.

The flowmeter 106 measures a flow rate of air flowing through the tube 104. The pressure gauge 107 measures pressure of air flowing through the tube 104. When the bellows tube 4 is pressurized and the pressurization exceeds a threshold value, the safety valve 108 opens and operates to prevent the bellows tube 4 from being damaged. When the bellows tube 4 is pressurized or vacuumed, the flow control device 109 controls the amount of air flowing through the tube 104 and adjusts the elongation/contraction speed of the bellows tube 4. Furthermore, a clearance hole, not shown, can be formed halfway through a flow path to supply the pressurized air from the pressure device 102 into the bellows tube 4 in order to prevent the bellows tube 4 from being expanded suddenly and thus damaged.

The extension regulating wire 110 extend between the lower closing member 3 provided at the lower end of the bellows tube 4 and the upper closing member 5 provided at the upper end of the bellows tube 4. In other words, one end of each of the extension regulating wire 110 is fixed to the lower closing member 3 and the other end thereof is fixed to the upper closing member 5. At least one extension regulating wire 110 has only to be provided, and the number thereof can be set arbitrarily. The extension regulating wire 110 are so designed that their length is at least shorter than the distance between the lower and upper closing members 3 and 5 when the bellows tube 4 elongates to the maximum length. It is therefore possible to prevent the bellows tube 4 from elongating beyond the maximum length and thus prevent the bellows tube 4 from being damaged. For example, when a vacuum target T whose weight exceeds the contraction force of the bellows tube 4 is lifted, the extension regulating wire 110 are able to support a load in their extended state (as shown in FIG. 7) to prevent a load from being added to the bellows tube 4.

As described above, the fourth embodiment brings about the same advantages as those of the foregoing third embodiment. In addition, since the selection valve 101a in the tube 104 of the bellows tube 4 and the selection valve 101b in the tube 105 of the suction pad 2 are provided separately from each other, the telescopic operation of the bellows tube 4 and the vacuum/vacuum release operation of the suction pad 2 can be controlled separately, and the device can be improved in its convenience.

Furthermore, according to the fourth embodiment, the flowmeter 106, pressure gauge 107 and flow control device 109 are provided halfway through the tube 104 connected to the bellows tube 4. Therefore, the telescopic operation of the bellows tube 4 can be controlled more minutely, the force of pressing the suction pad 2 on the vacuum target T and the speed of the pressing can be finely adjusted, and an appropriate process corresponding to the type of the vacuum target T can be performed.

Moreover, according to the fourth embodiment, the extension regulating wire 110 are attached to the internal space of the bellows tube 4. Therefore, when a vacuum target T whose weight exceeds the contraction force of the bellows tube 4 is lifted, the bellows tube 4 can be prevented from being damaged without applying a load to the bellows tube 4.

FIG. 8 shows a modification to the foregoing fourth embodiment. In the fourth embodiment, the tube 105 connected to the suction pad 2 is routed outside the bellows tube 4. In the modification shown in FIG. 8, part of the tube 105 is disposed in the internal space of the bellows tube 4 through a tube joint 112. The other structures are the same as those of the fourth embodiment.

(Fifth Embodiment)

Figure 9:
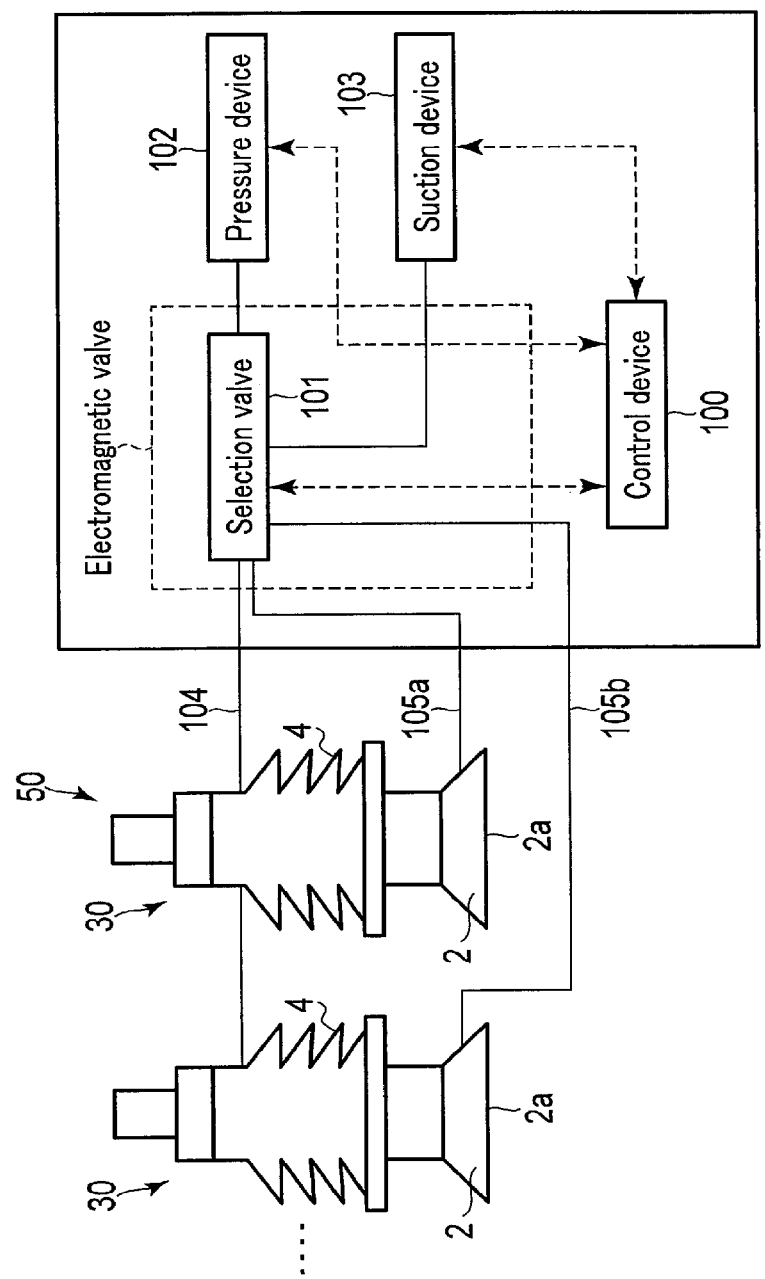
FIG. 9 is a block diagram showing an article holding device and its control system according to a fifth embodiment.

FIG. 9 is a block diagram showing an article holding device 50 (only the main part of which is shown here) and its control system according to a fifth embodiment. FIG. 10 is an illustration showing an operation of the article holding device 50. The article holding device 50 has a structure in which a plurality of vacuum devices 30 corresponding to the vacuum device 30 of the foregoing third embodiment are arranged on the undersurface of a hand 51 (holding section) (see FIG. 10). The control system of the fifth embodiment is substantially the same as that of the third embodiment.

The hand 51 includes a rectangular block-shaped housing extended in the horizontal direction. The bellows tubes 4 of the vacuum devices 30 are connected in series via a single tube 104. The suction pads 2 are connected in parallel via their respective tubes such as tubes 105a and 105b. The other structures are substantially the same as those of the foregoing third embodiment. Accordingly, the structural elements that perform the same function as those of the third embodiment are denoted by the same reference sign and their detailed descriptions will be omitted. In addition, the selection valve 101 is shown as one block in FIG. 9, but one selection valve is attached to each of the tubes such as tubes 104, 105a and 105b.

More specifically, all of the bellows tubes 4 are elongated by supplying pressurized air through the tube 104 to which the bellows tubes 4 are connected in series, and all of them are contracted by sucking air through the tube 104. Furthermore, a negative pressure generated on the vacuum surface 2a of each suction pad 2 can be on/off controlled by independently switching the selection valves provided for the tubes such as tubes 105a and 105b.

The article holding device 50 of the fifth embodiment also includes a manipulator, not shown, in addition to the hand 51 shown in FIG. 10. The manipulator is what is called a robot arm that is formed by attaching the hand 51 to the end of an arm (not shown). The manipulator moves the hand 51 to a desired position and moves the vacuum devices 30 to a desired place.

FIG. 10 is an illustration of an example of an operation of vacuuming a vacuum target T by the foregoing article holding device 50. In this example, it is assumed that the vacuum surfaces Ta opposed to the suction pads 2 of the vacuum devices 30 are different in height. For example, assume that the top surface of the vacuum target T are uneven. Even though a plurality of vacuum target T that differ in size are vacuumed and held at once, the same vacuum operation as above is performed.

When the vacuum target T shown in FIG. 10 is vacuumed, the article holding device 50 first sets the hand 51 in the horizontal position and arranges the vacuum devices 30 above the vacuum target T (FIG. 10a). In this state, the control device 100 switches the selection valve 101 to connect the tube 104 with the pressure device 102 and supplies pressurized air into the internal space of the bellows tube 4 of each of the vacuum devices 30.

Therefore, the bellows tubes 4 of all the vacuum devices 30 are elongated, and the vacuum surfaces 2a of the suction pads 2 of the bellows tubes 4 are pressed on the to-be-vacuumed surfaces Ta. of the vacuum target T (FIG. 10b). Each of the suction pads 2 can be vacuumed before the vacuum surface 2a contacts the to-be-vacuumed surface Ta as shown in, for example, FIG. 10(a) or when the vacuum surface 2a has contacted the to-be-vacuumed surface Ta or after the vacuum surfaces 2a of all the suction pads 2 have contacted the to-be-vacuumed surfaces Ta.

In this operation example, the to-be-vacuumed surfaces Ta are uneven as shown in FIG. 10 and the height of the to-be-vacuumed surfaces Ta that the suction pads 2 contact are different from one another. Accordingly, the elongation lengths of the bellows tubes 4 are different as shown in FIG. 10 (b) while all of the suction pads 2 contact their respective to-be-vacuumed surfaces Ta. In the article holding device 50 of the fifth embodiment, furthermore, pressurized air is supplied into all of the bellows tubes 4 through a single tube 104. Thus, the bellows tubes 4 are different in their elongation order and speed.

More specifically, pressurized air is supplied to start elongating the bellows tubes 4 and then one suction pad 2 is brought into contact with its opposing to-be-vacuumed surface Ta. Thus, no air is supplied further to the bellows tube 4 of the adsorption device 30 including the suction pad 2, and the vacuum device 30 stops elongating. In other words, the air supplied into the bellows tube 4 of the vacuum device 30 is supplied into the bellows tube 4 of another vacuum device 30.

As described above, the bellows tubes 4 of the vacuum devices 30 including the suction pads that contact the to-be-vacuumed surfaces Ta, stop elongating in sequence, and all of the suction pads 2 are brought into contact with their respective to-be-vacuumed surfaces Ta as shown in FIG. 10 (b). After the suction pads 2 are all brought into contact with their respective to-be-vacuumed surfaces Ta, the pressing force applied to the to-be-vacuumed surfaces Ta of all of the suction pads 2 is increased by pressurized air supplied further and thus uniformed and fixed.

When the suction pads 2 are brought into contact with the to-be-vacuumed surfaces Ta of a vacuum target T, the bellows tubes 4 have high linearity and thus adjacent vacuum devices 30 do not interfere with each other. As described above, since the bellows tubes 4 automatically stop elongating when the suction pads 2 are brought into contact with the to-be-vacuumed surfaces Ta, the length of the bellows tube 4 of each vacuum device 30 need not be adjusted such that the length of the bellows tube 4 matches the height of the to-be-vacuumed surface Ta, thereby simplifying the control of the article holding device 50. Furthermore, even though a to-be-vacuumed surface Ta is inclined, if the bellows tubes 4 are bent, the inclination of the suction surface 2a can be equal along the inclination of the to-be-vacuumed surface Ta, and the suction pad 2 can reliably be vacuumed on the to-be-vacuumed surface Ta.

Figure 11:
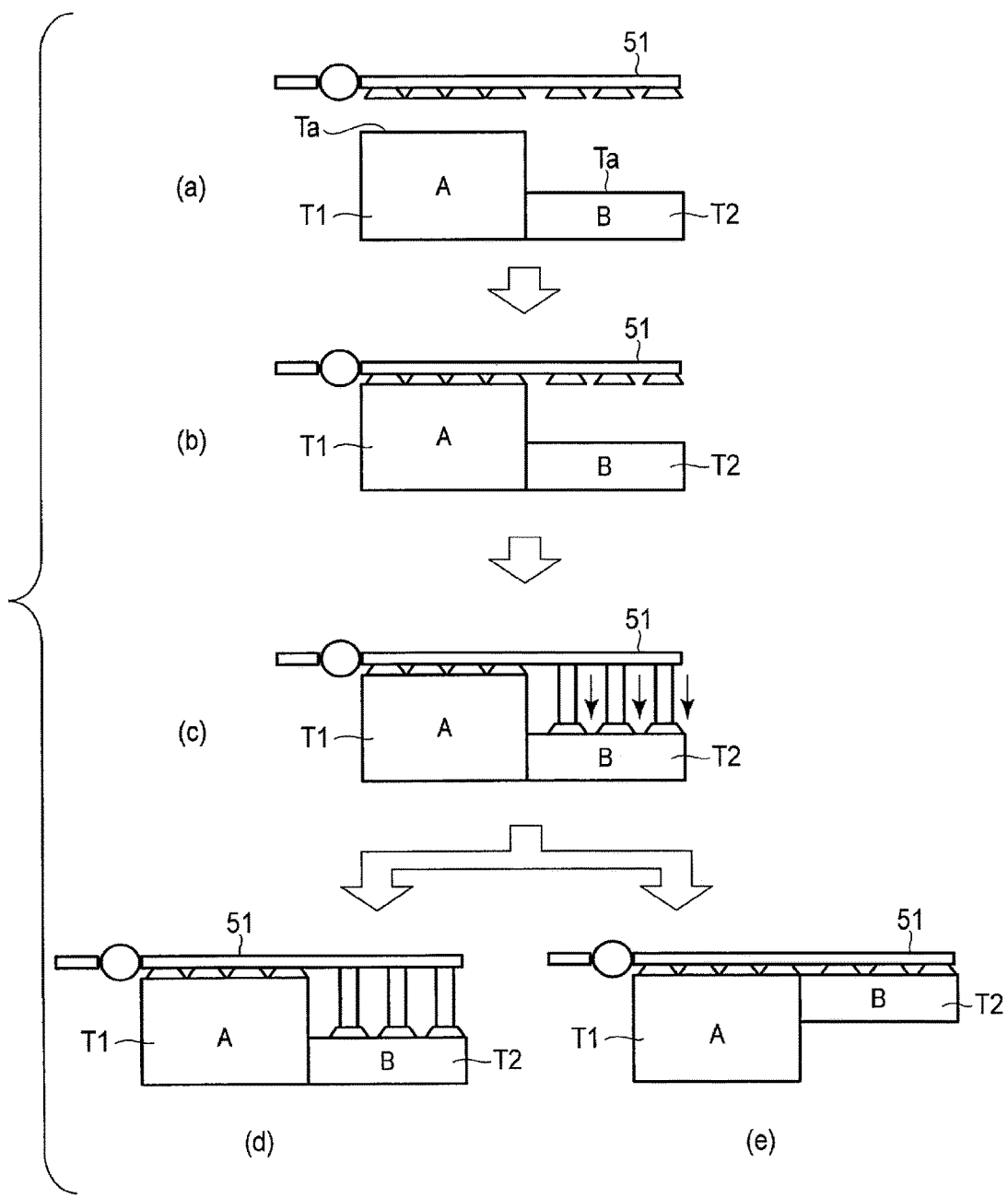
FIG. 11 is an illustration of an example of an operation performed by the article holding device shown in FIG. 9.

For example, as shown in FIG. 11, when two vacuum target T1 and T2 of different sizes are vacuumed and held at the same time, the hand 51 of the article holding device 50 is disposed above the vacuum target T1 and T2 (FIG. 11(a)). Then, the manipulator is operated to move the hand 51 downward to bring the suction pads 2 of some of the vacuum devices 30 into contact with the to-be-vacuumed surface Ta of the vacuum target T1 the size of which is larger (the to-be-vacuumed surface Ta of which is higher) (FIG. 11(b)). Furthermore, pressurized air is supplied into the bellows tubes 4 of all of the vacuum devices 30 to elongate the bellows tubes 4 and then bring the suction pads 2 of the other vacuum devices 30 into contact with the to-be-vacuumed surface Ta of the vacuum target T2 the size of which is relatively smaller (the to-be-vacuumed surface Ta of which is lower) (FIG. 11(c)). A negative pressure is generated on each of the suction pads 2 with arbitrary timing.

When the vacuum target T1 and T2 so vacuumed are moved, the manipulator is operated, as shown in FIG. 11(c), to move the hand 51 to a desired place with the vacuum target T1 and T2 vacuumed and positioned (FIG. 11(d)) or it is operated to move the hand 51 to a desired place with the bellows tubes 4 of all the vacuum devices 30 contracted and both of the vacuum target T1 and T2 lifted (FIG. 11(e)). When the vacuum target T1 and T2 are moved with the positions shown in FIG. 11(d), a step of lifting the vacuum target T2 can be eliminated and thus takt time can be shortened. On the other hand, when the vacuum target T1 and T2 are moved with the positions shown in FIG. 11(e), the risk that the vacuum target T2 will be swung and dropped during its movement can be reduced, and the operation reliability can be enhanced.

As described above, according to the fifth embodiment, a vacuum target T is vacuumed using a plurality of vacuum devices 30. Thus, a relatively large vacuum target T and a relatively heavy vacuum target T can be vacuumed and held. Furthermore, according to the fifth embodiment, even though one of the vacuum devices 30 is damaged, it can be supplemented with another one. Therefore, the vacuum holding reliability can be improved.

When a plurality of vacuum devices 30 are used as in the fifth embodiment, if one of the vacuum devices 30 is unable to vacuum a vacuum target T for some reason during its movement, another one is able to vacuum the vacuum target T. Thus, the vacuum target T can be prevented from dropping and, in this case, a selection valve 101 connected to a suction pad 2, which does not contact the vacuum target T, is closed.

According to the fifth embodiment, the bellows tubes 4 can flexibly be varied in position with the state of an article. Therefore, even though the to-be-vacuumed surface Ta of an vacuum target T is inclined or bent and the position of a vacuum target T is easily varied like a batch of paper sheets, these vacuum target T can reliably be vacuumed and their vacuum states are difficult to release when they are lifted.

Moreover, according to the fifth embodiment, a sensor for sensing a length of the bellows tube 4 of each of the vacuum devices 30 and a sensor for sensing pressure of pressurized air supplied into the internal space of the bellows tube 4 can be provided to detect various characteristics of an vacuum target T. As a sensor for sensing a length of each of the bellows tube 4, for example, a displacement gauge, a linear encoder and an ultrasonic sensor can be considered, but anything will be do if it is able to measure a length. As a sensor for sensing pressure of pressurized air, a pressure sensor can be considered.

If the suction pads 2 of a plurality of vacuum devices 30 are brought into contact with the to-be-vacuumed surfaces Ta of a plurality of vacuum target T of different sizes to detect a length of the bellows tube 4 of each of the vacuum devices 30, the vacuum target T can be recognized separately for each of the sizes. If a length of a bellows tube 4 is detected when an vacuum target T is vacuumed and moved, the rough weight of the vacuum target T can be detected. If the length of a bellows tube 4 is monitored when an vacuumed and held vacuum target T is moved down to a floor, it is possible to determine whether the vacuum target T has contacted the floor.

If, furthermore, pressure of pressurized air supplied into the bellows tube 4 of each of the vacuum devices 30 is detected, it is possible to determine whether the bellows tube 4 is damaged or not, and the bellows tube 4 can be repaired with appropriate timing before a serious incident, such as a drop of a vacuum target T, occurs.

In any case, the operation of the article holding device 50 of the fifth embodiment can be performed based on programs of software. A versatile computer system stores the programs in advance and reads in the programs to allow the operation of the article holding device 50 to be performed. More specifically, the foregoing operation examples are stored, as computer-executable programs, in a recording medium, such as a magnetic disk (e.g. a flexible disk and a hard disk), an optical disk (e.g. CD-ROM, CD-R, CD-RW, DVD-ROM, DVD±R, DVD±RW, Blu-ray (registered trademark) Disc), and a semiconductor memory. If a computer or a built-in system is a readable storage medium, any storage format can be used. The above-described operations can be performed if the computer reads in a program from the recording medium and causes a CPU to execute instructions described in the programs. The computer may acquire or read in the programs via a network.

Furthermore, for example, an operating system (OS) running on the computer based on the instructions of programs installed in the computer or built-in system from the recording medium, database management software, and middleware such as a network, may perform some of the processes to achieve the foregoing operations.

Moreover, the recording medium used here is not limited to a medium independent of the computer or built-in system but includes a recording medium that stores or temporarily stores programs downloaded via a LAN, the Internet and the like.

The number of recording mediums is not limited to one. The processes of the above operation examples can be performed from a plurality of mediums. The mediums may have any configuration.

The computer or built-in system used here performs each of the processes on the basis of the programs stored in the recording medium. It may have any configuration corresponding to a single device such as a personal computer and a microcomputer, a system to which a plurality of devices are connected via the network, and the like.

The computer used here is not limited to a personal computer but includes, e.g. a microcomputer and an arithmetic processing unit included in information processing equipment. The computer is a general term of equipment or a device capable of performing functions using programs.

In the foregoing fifth embodiment, a plurality of vacuum devices corresponding to the vacuum device 30 of the third embodiment are disposed on the hand 51. The vacuum device 10 of the first embodiment and the vacuum device 20 of the second embodiment can be disposed alone or in combination.

According to the vacuum devices of the foregoing first to fourth embodiments, the bellows tubes 4 are elongated and contracted to vacuum their suction pads 2 on the vacuum target T. Thus, the suction pads 2 can reliably be vacuumed on the to-be-vacuumed surfaces Ta of the vacuum target T.

Furthermore, according to the article holding device of the foregoing fifth embodiment, a plurality of vacuum target T of different heights can be vacuumed at the same time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the methods described herein may be made without departing from the spirit of the inventions. The accompanying claims and their equivalents are intended to cover such forms or modifications as would fall within the scope and spirit of the inventions.

In the foregoing embodiments, for example, the vacuum devices 10, 20 and 30 are configured using one bellows tube 4. In addition to this, one vacuum device can be configured by connecting two or more bellows tubes 4 in series through a connection member. In this case, a through hole can be formed in the connection member that connects the bellows tubes 4 or a tube can be connected to each of the bellows tubes 4 to circulate fluid therethrough.

Furthermore, according to the above-described embodiments, the bellows tube 4 is used as a telescopic member that is elongated and contracted by expanding and contracting the internal space of the bellows tube by pressure of fluid. In addition to this, for example, the telescopic member can be configured by limiting a deformation direction of a balloon that can be expanded and contracted, to one direction.

In the above-described embodiments, the selection valve includes an electromagnetic valve. In addition to this, a selection valve that is operated by air pressure can be used and, in this case, no wiring to connect electromagnetic valves is necessary. Therefore, the structure of the device can be simplified and the appearance of the device can be enhanced.

What is claimed is:

1. A vacuum device comprising:
a suction pad configured to be vacuumed on a to-be-vacuumed surface of a vacuum target;
a bellows tube having an internal space that expands and contracts in a telescopic direction, the bellows tube having one end and another end on opposite sides of the internal space;
a lower closing member configured to close the one end of the bellows tube in an airtight manner, said lower closing member coupling the suction pad to the one end of the bellows tube;
a connection tube and a an upper closing member, said connection tube connected via said upper closing member in an airtight manner to the another end of the bellows tube and communicating with the internal space of the bellows tube;
a selection valve device;
a pressure device coupled to the selection valve device and configured to supply pressurized fluid into the internal space through the selection valve device and the connection tube;
a negative pressure device coupled to the selection valve device and configured to vacuum to the internal space through the selection valve device and the connection tube; and
the selection valve device configured to select one of the pressure device and the negative pressure device as a destination to be connected to the connection tube;
a negative pressure generator disposed on the lower closing member and the connection tube and configured to apply a vacuum to the suction pad; and
a controller configured to control selecting by the selection valve device and, independently of selecting by the selection valve device, to control applying of vacuum by the negative pressure generator to the suction pad.

2. The vacuum device of claim 1, further comprising:
a flowmeter which measures a flow rate of fluid flowing through the connection tube;
a pressure gauge which measures pressure of fluid flowing through the connection tube; and
a flow rate control device which controls a flow rate of fluid flowing through the connection tube based on the flow rate measured by the flowmeter and/or the pressure measured by the pressure gauge.

3. The vacuum device of claim 1, further comprising an extension regulating wire disposed in the internal space of the bellows tube to connect the one end of the bellows tube with the another end thereof, the extension regulating wire being shorter than the bellows tube that is elongated to a maximum.

4. The vacuum device of claim 1, wherein the selection valve device is operated by pressure of fluid.

5. An article holding device comprising:

a plurality of vacuum devices each including, a suction pad having one end configured to be vacuumed on a to-be-vacuumed surface of a vacuum target, bellows tube having an internal space that expands and contracts in a telescopic direction, the bellows tube having one end and another end on opposite sides of the internal space, a lower closing member configured to close the one end of the bellows tube in an airtight manner, said lower closing member coupling the suction pad to the one end of the bellows tube, a connection tube and an upper closing member, said connection tube connected via said upper closing member in an airtight manner to the another end of the bellows tube and communicating with the internal space of the bellows tube, a selection valve device, a pressure device coupled to the selection valve device and configured to supply pressurized fluid into the internal space through the selection valve device and the connection tube, a negative pressure device coupled to the selection valve device and configured to vacuum to the internal space through the selection valve device and the connection tube; and the selection valve device configured to select one of the pressure device and the negative pressure device as a destination to be connected to the connection tube, and a negative pressure generator disposed on the lower closing member and the connection tube and configured to apply a vacuum to the suction pad;

a controller configured to control selecting by each selection valve device and, independently of selecting by each selection valve device, to control applying of vacuum by each negative pressure generator to the respective suction pad;

a holding section which fixes other end of the suction pad along the telescopic direction of each of the vacuum devices; and a manipulator which moves the holding section.

6. The article holding device of claim 5, further comprising:

a first sensing unit which senses an amount of elongation/contraction of each bellows tube;

a second sensing unit which senses pressure of fluid supplied into the internal space of each bellows tube; and said controller configured to control the negative pressure device based on sensing results of the first sensing unit and the second sensing unit.

7. A vacuum device comprising:

a suction pad vacuumed on a to-be-vacuumed surface of a vacuum target;

a telescopic member having the suction pad at one end in a telescopic direction and having an internal space that expands and contracts, the telescopic member being elongated and contracted in the telescopic direction by expansion and contraction of the internal space;

a flowmeter which measures a flow rate of fluid flowing through the telescopic member;

a pressure gauge which measures pressure of fluid flowing through the telescopic member; and a flow rate control device which controls a flow rate of fluid flowing through the telescopic member based on the flow rate measured by the flowmeter and/or the pressure measured by the pressure gauge.

* * * * *